United States Patent

Sezan et al.

[11] Patent Number: 5,956,458
[45] Date of Patent: Sep. 21, 1999

[54] SYSTEM AND METHOD FOR DETERMINING REPRESENTATIVE FRAMES OF VIDEO CAPTURED BY A VIDEO CAMERA

[75] Inventors: Muhammed Ibrahim Sezan, Vancouver; Shawmin Lei, Camas; Jeffrey Brian Sampsell, Vancouver, all of Wash.

[73] Assignee: Sharp Laboratories of America, Inc., Camas, Wash.

[21] Appl. No.: 08/746,254

[22] Filed: Nov. 7, 1996

[51] Int. Cl.⁶ ................................... H04N 5/91
[52] U.S. Cl. ........................... 386/95; 386/69
[58] Field of Search ................ 386/46, 52, 56, 386/64, 69–70, 81–83, 95; 360/5; 348/239; H04N 5/91

[56] References Cited

U.S. PATENT DOCUMENTS

| | | | |
|---|---|---|---|
| 4,641,203 | 2/1987 | Miller | 358/335 |
| 4,723,181 | 2/1988 | Hickok | 360/72.2 |
| 4,805,039 | 2/1989 | Otake et al. | 358/335 |
| 4,999,709 | 3/1991 | Yamazaki et al. | 348/239 |
| 5,046,167 | 9/1991 | Nakano et al. | 358/335 |
| 5,050,003 | 9/1991 | Horii et al. | 358/342 |
| 5,111,291 | 5/1992 | Erickson et al. | 358/108 |
| 5,122,886 | 6/1992 | Tanaka | 358/335 |
| 5,157,511 | 10/1992 | Kawai et al. | 358/335 |
| 5,233,485 | 8/1993 | Yang | |
| 5,355,259 | 10/1994 | Shih | |
| 5,384,668 | 1/1995 | Shih et al. | |
| 5,442,493 | 8/1995 | Shih et al. | |
| 5,479,205 | 12/1995 | Silverbrook | 348/239 |
| 5,515,101 | 5/1996 | Yoshida | 348/239 |
| 5,689,610 | 11/1997 | Manico et al. | 386/46 |

FOREIGN PATENT DOCUMENTS

| | | | |
|---|---|---|---|
| 0 393 955 A1 | 10/1990 | European Pat. Off. | H04N 5/782 |
| 0545727 A2 | 6/1993 | European Pat. Off. | G11B 27/11 |

OTHER PUBLICATIONS

SD Specifications of Consumer–Use Digital VCR; HD Digital VCR Conference; Dec. 1994.
Operations Manual (Portions) Sharp Model VL–DC1U Viewcam; AT least as early as Jan. 1, 1996.

*Primary Examiner*—Wendy Garber
*Assistant Examiner*—Vincent F. Boccio
*Attorney, Agent, or Firm*—Robert D. Varitz, P.C.

[57] ABSTRACT

A system and method of determining representative frames of a video sequence to form a visual table of contents for a video tape is disclosed. A representative frame is identified on the occurrence of an event, such as the beginning of a recording sequence, which may follow a record command, a pause-release command, some form of special effect command, or a user-initiated marking command. The representative frame, and location data associated therewith, may be marked along the length of a video tape in a camcorder or VCR, or, the representative frame may be identified and stored, along with the location data therefor, on a MIC. In the case where the representative frame location data is stored on the tape, a scanning mechanism is provided for scanning the recorded video tape to locate the representative frames. In either form of the invention, multiple representative frames and their location data are placed in a storage mechanism, either temporarily or permanently, and then recorded at a single location, either at the beginning of the video tape or in the MIC. A peripheral storage mechanism may also be provided, in the form of a computer, which may be used to add additional information to the representative frame, and which may also be used in editing the video tape.

21 Claims, 3 Drawing Sheets

SYSTEM AND METHOD FOR DETERMINING REPRESENTATIVE FRAMES OF VIDEO CAPTURED BY A VIDEO CAMERA

BACKGROUND OF THE INVENTION

This invention relates to manipulation of video and data on a video tape, and specifically to the identification and the collecting of representative frames of video to provide a visual table of contents for a video tape.

Standards of consumer-use digital video cassette recorder (DVCR) provide specifications for the recording of video and audio signals on a digital video tape, as well as providing for the recording of peripheral information on the tape or, in some instances, for the recording of information on what is referred to as memory-in-cassette (MIC). This is a significant advance over the limited information which may be placed on an analog tape. As will be explained later herein, consumer-use DVCR standards provide for audio auxiliary data, video auxiliary data, a variety of mandatory and optional data, which is recorded in the form of data packets (PACKs), which are included in groups broadly identified as sub-code data and system data.

BRIEF SUMMARY OF THE INVENTION

The instant invention defines a system and method of determining a representative frame of a video sequence. This representative frame is identified on the occurrence of an event, such as the beginning of a recording sequence, which may follow a record command, a pause-release command, some form of special effect command, or an event-specific signal initiated by the user. The representative frame, and location data associated therewith, may be marked along the length of a video tape in a VCR or a camcorder, or, the representative frame may be identified and stored, along with the location data therefor, on a MIC, which is a memory device suitable for storing a large quantity of data, such as a flash memory device. In the case where the representative frame location data is initially marked and then stored on the tape, a scanning mechanism is provided for scanning the recorded video tape to locate the representative frames. In either form of the invention, multiple representative frames and their location data are placed in a storage mechanism, either temporarily or permanently, and then recorded at a single location, either at the beginning of the video tape or in the MIC. A peripheral storage mechanism may also be provided, in the form of a computer, which may be used to insert additional information in the representative frame, and which may also be used in editing and archiving the video tape contents. A mechanism for marking representative frames is located in a camcorder, or in a video cassette recorder.

It is an object of the invention to provide a system and method for constructing a visual table of contents for a video tape.

Another object of the invention is to provide a visual table of contents which is stored on the video tape.

Another object of the invention is to provide a visual table of contents which is stored on a memory device in the cassette for a video tape.

These and other objects and advantages of the invention will become more fully apparent as the description which follows is read in conjunction with the drawings.

DETAILED DESCRIPTION OF THE PREFERRED EMBODIMENTS

Figure 1:
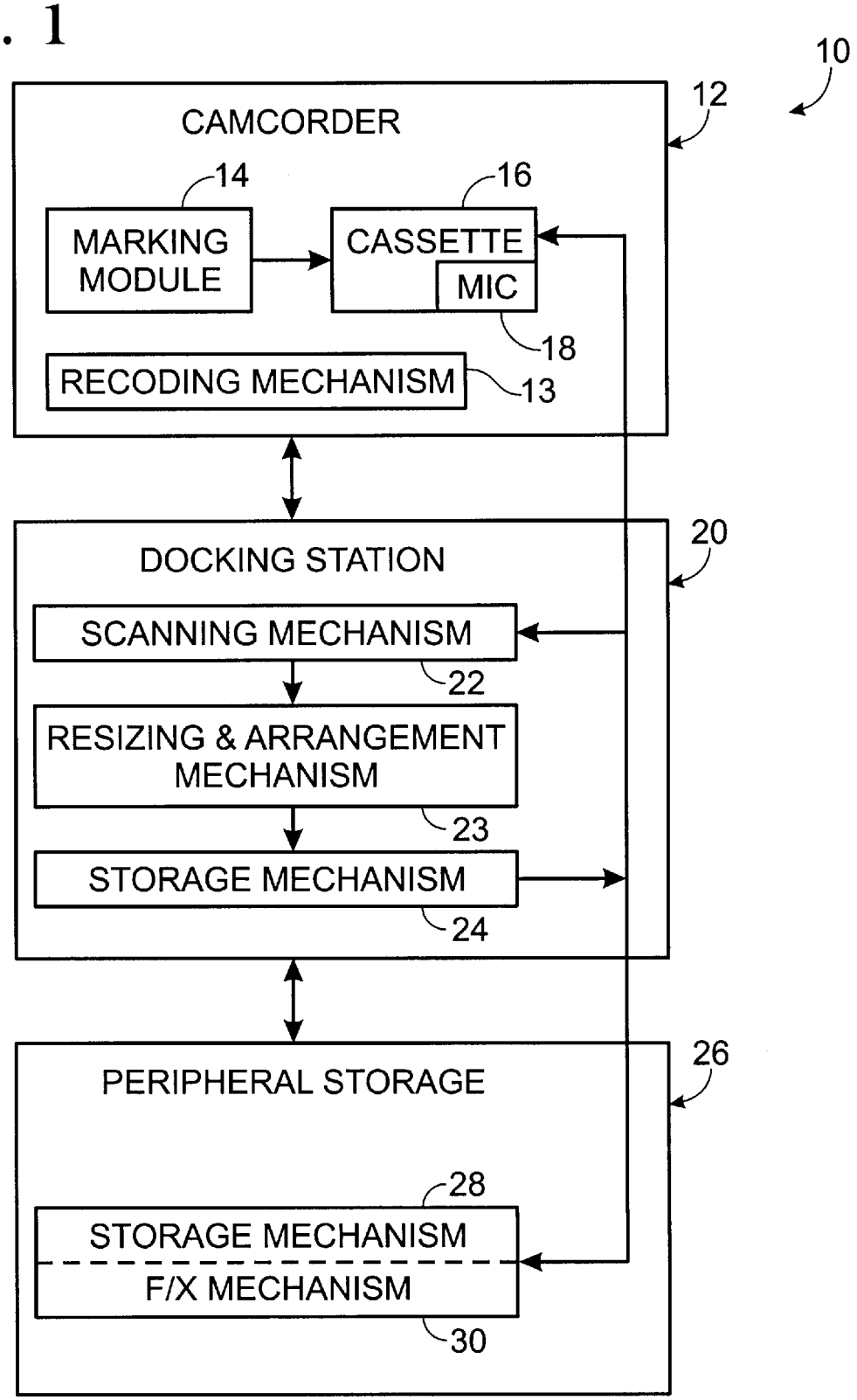
FIG. 1 is a block diagram of the system of the invention.

Referring now to the drawings, initially to FIG. 1, the system for determining representative frames of video captured by a video camera is depicted in block-diagram form generally at 10. The representative frames of video are collected and assembled to provide a visual table of contents for the video tape. System 10 includes a camcorder 12, having a recording mechanism 13 and a marking module 14 located therein. Marking module 14, in this embodiment of the invention, is operational to determine a representative frame of video during capture of a video image by camcorder 12. Camcorder 12 is constructed and arranged to receive a video tape cassette 16, which may, in one embodiment of the invention, include a memory-in-cassette (MIC) mechanism 18.

System 10, in this embodiment, includes a docking station 20, which receives camcorder 12 for further processing of the video tape. Docking station 20 includes a scanning mechanism 22, a resizing and arrangement mechanism 23 and a storage mechanism 24. A peripheral storage mechanism 26 may be provided in the form of a personal computer, and may have an additional storage mechanism 28 and a special effects (F/X) mechanism 30 located therein, which provides an editing and archiving function. Other embodiments of the system may include a camcorder which includes the components of docking station 20.

Figure 2:
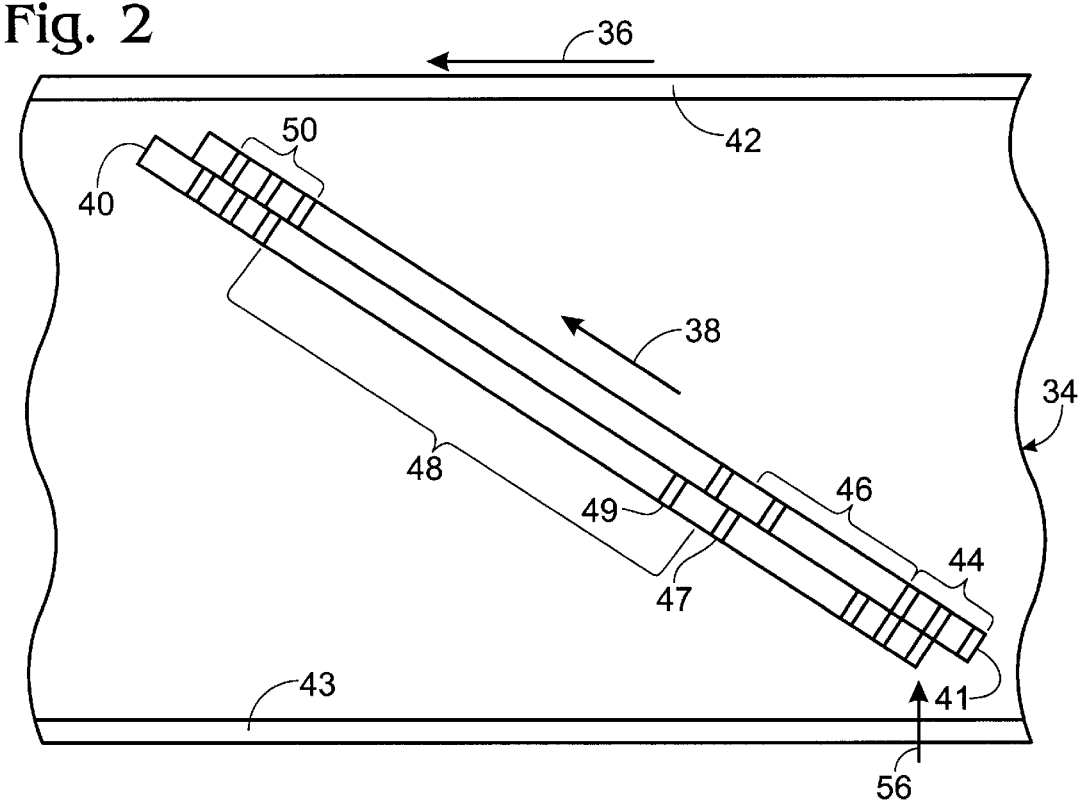
FIG. 2 is a schematic representation of a digital video tape.

Referring now to FIG. 2, a length of video tape is depicted generally at 34. The structure of the tape according to the DVCR standard is as follows: each frame contains video, audio and other data, which is stored in multiple tracks. Tape 34 moves over a recording head in the direction indicated by arrow 36, while the recording head rotates in the direction indicated by arrow 38. It will be understood by those of skill in the art that tape 34 is being viewed from the magnetic media side thereof. The data for each frame is stored in multiple A/V tracks, such as first A/V track 40 and second A/V track 41. The DVCR standard applicable in countries using a 60 Hz power supply requires 525 lines of resolution, located in 10 A/V tracks per frame. The DVCR standard in 50 Hz countries requires 625 lines of resolution, located in 12 A/V tracks per frame. The DVCR standard also provides for a first optional track 42 and a second optional track 43.

Each A/V track has four main sectors: (i) an insert and track information (ITI) sector 44, (ii) an audio sector 46, having an audio auxiliary (AAUX) sector 47 therein, (iii) a video sector 48, having a video auxiliary (VAUX) sector 49 therein, and (iv) a sub-code sector 50. Compressed audio and video data are recorded on tape 34 in audio sector 46 and video sector 48, respectively. Peripheral, or optional, information (data) may be recorded in AAUX sector 47, VAUX sector 49 and sub-code sector 50. Each of the AAUX, VAUX and sub-code sectors, and MIC 18, is further divided into "common optional" and "maker's optional" areas. These optional areas, particularly the maker's optional areas, may be used as a storage location for signals, or reference marks, which are placed on video tape 34, or MIC 18, to mark representative frames of video.

The DVCR standard provides for what are referred to as maker-option PACKS (MOPs). A PACK is a unit of some data groups. A PACK is five bytes long and includes a one-byte header PACK ($PC_0$) having upper and lower four-bit blocks, and a four-byte data PACK ($PC_1$–$PC_4$). MOPs are located in the data section of a synchronization block, which is located in sub-code sector 50 of an A/V track. Each sub-code sector has twelve sub-code sync blocks, each having a 12 byte length, five bytes of which are sub-code data. The sub-code area is divided into MAIN and OPTIONAL areas, with part of the optional areas, identified as the maker's optional area, being available to manufacturers for use as they see fit.

Figure 3:
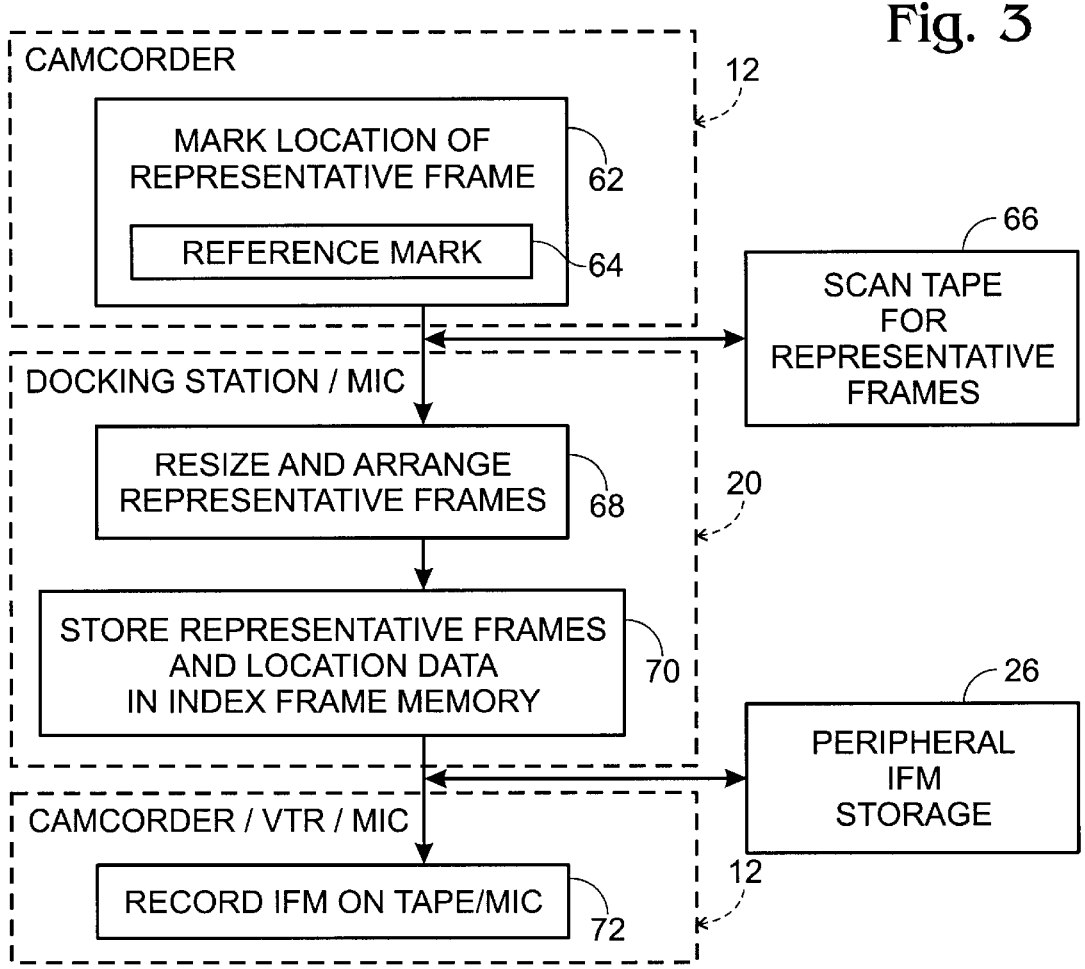
FIG. 3 is a block diagram of the components of the system and method.

Referring to FIG. 3, the method of the invention is depicted generally at 60. The first A/V track of a representative frame, such as track 40, is identified and marked 62 on the tape upon the occurrence of a predetermined event. The location of the first A/V track, $T_p$, of a representative frame is identified by arrow 56 in FIG. 2, which arrow is symbolic of a reference mark 64 which is placed in the first A/V track of a representative frame. As previously noted, reference mark 64 may be placed in the AAUX sector, the VAUX sector, the sub-code, or, if so equipped, the track number of reference mark 64 location may be placed in MIC 18 of the tape cassette. The preferred location of reference mark 64 is in the maker's optional area of the sub-code sector, as this location provides the most efficient retrieval of data when compared to the AAUX and VAUX sectors.

The predetermined event which initiates the identification of a representative frame may be the beginning of a recording sequence, which is initiated by pressing the record button on a camcorder, the release of a pause button on a camcorder, or the beginning of a special effects sequence on the tape. An event-specific signal may be initiated by the user to mark an event that the user wishes to identify during a recording sequence. The representative frame is identified by marking module 14 which is built into camcorder 12 and which is operable to place a coded instruction (reference mark 64) on tape 34. Reference mark 64 is a pre-defined binary word.

It should also be appreciated that the system and method of the invention may be incorporated into a VCR so that tapes recorded without the benefit of the instant invention may be marked so as to have a visual table of contents incorporated thereon. Such a VCR will include a marking module which is activated by a user of the system. Reference marks may be placed on a tape by the user, the tape is scanned and an index frame (IF) compiled and a video table of contents recorded at the beginning of the tape. Alternately, an IF is compiled in a MIC as the representative frames are identified by the user during the playback of a previously recorded tape.

As previously noted, in some instances, a video cassette may contain a memory-in-cassette (MIC) mechanism 18, mechanism, such as a flash memory chip, which may be used to store the information associated with a representative frame. This portion of the description, however, will focus on the marking of representative frames on the tape in a video cassette not having a separate memory structure.

After the video tape has been recorded, it may be scanned to determine the number and location of representative frames along the length of the video tape, block 66 in FIG. 3. This function is accomplished by scanning mechanism 22, which may be located in a camcorder, or in a docking station, which is provided for the camcorder and which has controls and a storage mechanism 24, in additional to those found in camcorder 12.

Features of the representative frames may be used in an interactive, content-based image/video database for search and retrieval of the video and/or its individual scenes, as well as in video editing. The representative frames are appropriately resized and the into a single index frame that may be recorded on the same video tape at a predetermined location for subsequent viewing and/or output.

As video tape 34 is scanned, representative frames and the location data therefor are read by scanning mechanism 22 and, in the preferred embodiment, are resized and arranged so as to allow the presentation of multiple representative frames in a single video image, block 68.

The resized and arranged representative frames are placed in storage mechanism 24 until all such representative frames are retrieved from the length of video tape 34. The resized and arranged representative frames comprise an index frame, which is stored in an index frame memory (IFM) 70 within storage mechanism 24, and are subsequently recorded on video tape 34 by a recording mechanism 13, which is a standard component of camcorder 12 or a VCR. Resizing and arranging may alternately be performed by a mechanism located in a camcorder. As previously noted, reference mark 64 may be located in the maker's optional area of sub-code sector 50. The index frame may be compressed and recorded and stored in video sector 48, or in the maker's optional area of MIC 18, if it is supported.

DVCR standards require a "dead zone" on the first 175 mm of video tape following the tape leader. Absolute A/V track $T_\emptyset$ is located immediately after the 175 mm length of tape. A feature of the instant invention is the reservation of the first 30 seconds of tape following track $T_\emptyset$ for use with the index frame of the invention. The A/V tracks are sequentially numbered along the length of tape 34 from $T_\emptyset$ . . . $T_n$.

As previously noted, peripheral storage 26 may be provided, and may take the form of a personal computer of some type. Peripheral storage 26, also referred to herein as peripheral index frame memory storage, may be used to edit and enhance the information contained in the representative frame and location data therefor, and may also be used to provide F/X. Peripheral storage 26 may also provide command and control functions for docking station 20, and may also provide the resizing and arrangement mechanism.

Another feature of a camcorder incorporating the invention is the ability to turn the system off, if the user so desires, thereby directing the use of the first 30 seconds of tape to conventional recording. It should also be appreciated that the system and method of the invention is adaptable to analog video systems, wherein reference mark 64 may be incorporated onto a video or audio track for sensing by a scanning mechanism. The index frame may be generated by digital means and converted for recording onto an analog tape.

Figure 4:
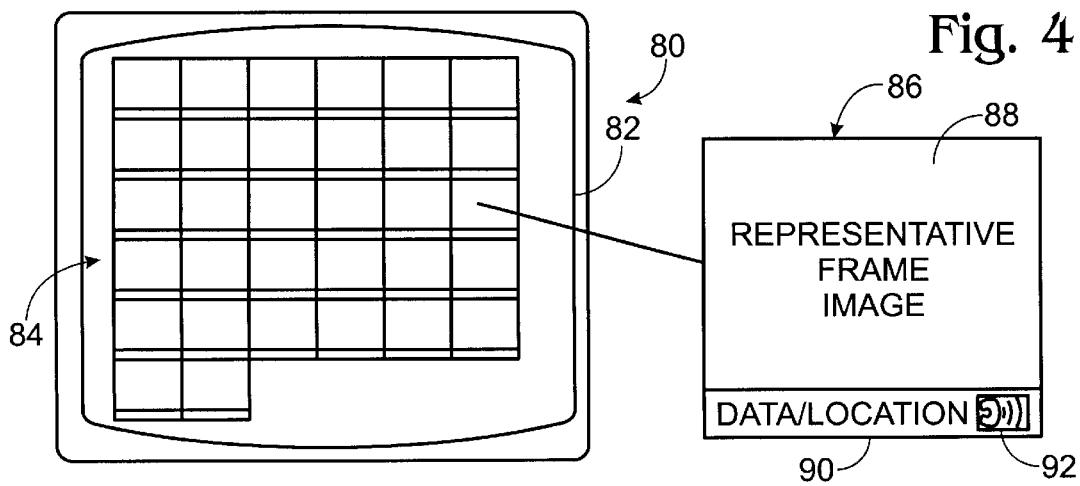
FIG. 4 is a monitor having an index frame memory display depicted thereon.

Referring now to FIG. 4, a television monitor is depicted generally at 80. Monitor 80 includes a screen 82 on which is displayed a plurality of representative frames as stored in an index frame memory and displayed as a single multiple image video frame, generally at 84. Index frame memory display will generally have the same spatial resolution as a full DVCR frame, on the order of 720×486 resolution (525 line system). The index frame memory may contain one or more pages of representative frames, and may be located in camcorder 12, in docking station 20, or in peripheral storage 26.

An enlarged representative frame is depicted generally at 86 and would include an image portion 88 and a data portion 90. Data portion 90 may include location data relevant to image portion 88. A sound bite icon 92 is provided which, assuming that all of the prerequisites have been met, will provide a sound clip which is associated with the representative frame and the several frames following the representative frame. The sound clip may be incorporated within a MIC structure, or placed in the VAUX, AAUX, or in the sub-code.

In the event that peripheral IFM storage 26 is provided, the user may edit the text displayed in data portion 90 of representative frame 86.

Figure 5:
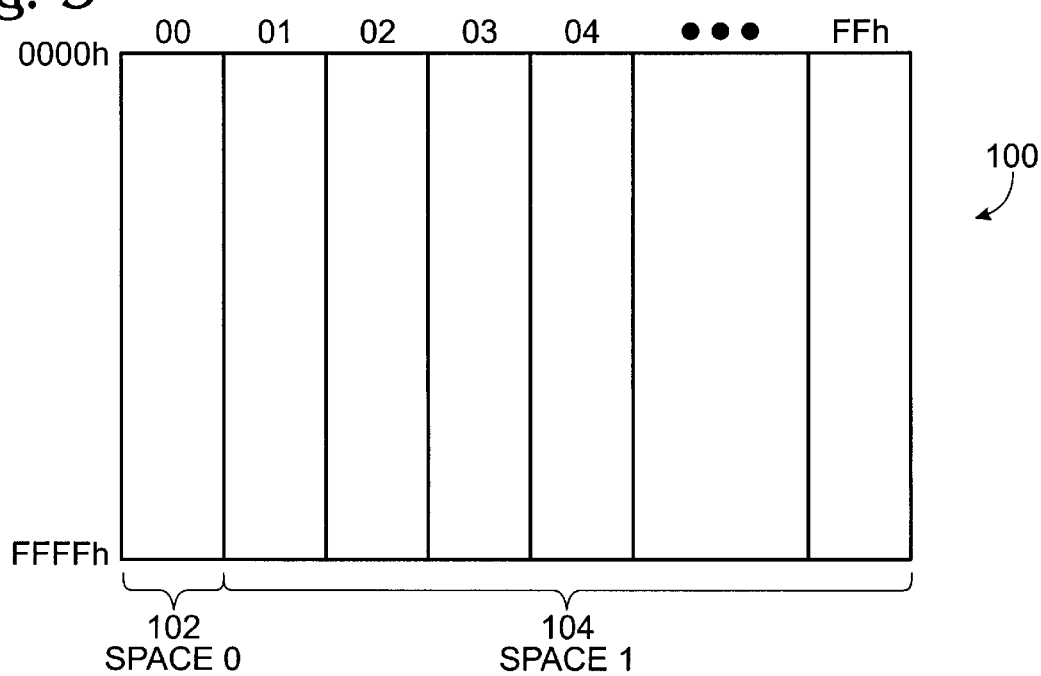
FIG. 5 is a depiction of the MIC storage mechanism.

As previously noted, some video cassettes compliant with the DVCR standard may contain an onboard memory structure, which is referred to as memory-in-cassette (MIC). The memory structure of a MIC is depicted generally at 100 in FIG. 5. The MIC structure is connected to camcorder 12 or to a VCR by a four-terminal connector using inter-integrated circuit ($I^2C$) protocol. MIC structure 100 in the DVCR standard is divided into two main portions, the first being space or bank Ø, depicted at 102, and the second being space 1, depicted at 104, having up to 255 banks. Each bank contains 64 Kbytes of memory space. Space Ø has a number of predetermined usages which are determined by the standards for consumer-use digital video. The remainder of space Ø, and all of space 1, may be used for storage of data, sound, and video as defined by the manufacturer of the camcorder or VCR which uses a cassette equipped with MIC. The DVCR standard provides for MIC of up to 16 Mbytes. It is expected that most commercially available cassettes will contain 4 or 5 Mbyte MICS.

In the case where a MIC is provided on the cassette, marking module 14 of camcorder 12 will still mark the tape with a reference mark, however, the associate representative frames immediately will be resized and arranged by resizing and arrangement mechanism 23, which in this embodiment, is located in camcorder 12, and placed in MIC 18, which also serves as the storage mechanism and index frame memory. Location information, in the form of the first track numbers of representative frames, $T_f$, is also recorded in the MIC. The index frame memory will immediately be available to the user and will be updated as new video and sound are recorded on the video tape, without the need to scan the entire video tape to compile the IFM. Playback of the index frame may be a continuous play of the first 30 seconds of tape, or, the index frame may be a single frame having multiple images with an instruction to cause the playback device to pause on that frame. It should be understood that there may be multiple index frames, each with multiple images therein, depending on the number of representative frames identified on the tape.

Although a preferred embodiment, and one alternate thereof, have been described herein, it should be appreciated that variations and modifications may be made to this invention as defined in the appended claims.

We claim:

1. A system for determining representative frames of a video sequence captured on a video tape contained in a video cassette, comprising:

a marking module for marking with a reference mark and identifying the location, on a video tape, upon the occurrence of each of several predetermined events, thereby to identify a representative frame associated with the predetermined event on the recorded video tape and to generate location data therefore, wherein said reference mark is a magnetically-stored binary word, and wherein said predetermined event is taken from the group of events consisting of the beginning of a recording sequence, the pressing of a record button, the releasing of a pause button, adding a special effect, and initiating an event-specific signal;

a storage mechanism associated with the video tape cassette for storing plural representative frames and location data associated therewith; and a recording mechanism for recording plural representative frames to provide a selectably viewable visual table of contents for the video tape.

2. The system of claim 1 which further includes a scanning mechanism for scanning said recorded video tape having said representative frames marked thereon to retrieve said representative frame and said location data therefrom when said reference mark is located.

3. The system of claim 1 wherein said marking module is located in a camcorder and said scanning mechanism, said storage mechanism and said recording mechanism are located in a docking station.

4. The system of claim 1 wherein said marking module is located in a camcorder and said storage mechanism and said recording mechanism are located in a video tape cassette.

5. The system of claim 1 wherein said marking module, said scanning mechanism, said storage mechanism and said recording mechanism are located in a camcorder.

6. The system of claim 1 wherein said marking module is located in a camcorder and said scanning mechanism, said storage mechanism and said recording mechanism are located in a video tape recorder.

7. The system of claim 1 wherein plural representative frames said location data therefore are recorded on the video tape.

8. The system of claim 1 wherein said marking module is located in a camcorder and said scanning mechanism, said storage mechanism and said recording mechanism are located in a docking station, and which further includes a peripheral storage mechanism.

9. The system of claim 1 which includes a re-sizing mechanism for re-sizing the representative frames so that plural representative frames are displayed as a single multiple image video frame.

10. The system of claim 9 wherein said multiple image video frame includes location data.

11. The system of claim 1 wherein the location of a representative frame is identified by location data, and wherein said location data includes a time-code and said reference mark, and wherein said reference mark is not visually perceptible during normal viewing of the video sequence.

12. A method for generating a multiple image representative frame of a video sequence captured on a video tape contained in a video tape cassette comprising:

marking the location of a representative frame of video data with a reference mark upon the occurrence of a predetermined event; wherein said predetermined event is taken from the group of events consisting of the beginning of a recording sequence, the pressing of a record button, the releasing of a pause button, adding a special effect, and initiating an event-specific signal, wherein said reference marks is a binary word which is recorded with the first frame of an event, and wherein said reference mark is not visually perceptible during normal viewing of the video sequence;

identifying location data associated with each representative frame, wherein said location data includes time-code data which is distinct from said reference mark;

storing the representative frames and the location data associated therewith in an index frame memory in the video tape cassette;

merging representative frames and the location data associated therewith into a single multiple image video frame; and recording the multiple image video frame on the video tape cassette to provide a visual table of contents.

13. The method of claim 12 which further includes scanning a recorded video tape for representative frames and location data as indicated by the presence of said reference mark on the video tape and wherein said recording step includes recording the multiple image video frame onto the video tape in a single location.

14. The method of claim 13 wherein said recording includes recording the multiple image video frame into a memory unit in a video cassette.

15. A system for determining representative frames of a video sequence captured on a video tape contained in a video tape cassette, comprising:

a marking module for marking and identifying the location, on a video tape, upon the occurrence of a non-linear predetermined event, thereby to identify a representative frame associated with the event on the recorded video tape and to generate location data therefore, wherein said predetermined event is taken from the group of events consisting of the beginning of a recording sequence, the pressing of a record button, the releasing of a pause button, adding a special effect, and initiating an event-specific signal, and wherein said reference mark is a binary word recorded in said video tape cassette, and wherein said reference mark is not visually perceptible during normal viewing of the video sequence, wherein said location data includes time-code data and said reference mark:

a storage mechanism for storing plural representative frames and location data associated therewith, wherein said storage mechanism is located in the video tape cassette; and a recording mechanism for recording plural consecutive representative frames to provide a visual table of contents for the video tape.

16. The system of claim 15 which includes a re-sizing mechanism for re-sizing the representative frames so that plural representative frames are displayed as a single multiple image video frame.

17. The system of claim 15 which further includes a scanning mechanism for scanning said recorded video tape having said representative frames marked thereon to retrieve said representative frame and said location data therefrom, wherein the retrieval of said representative frame and said location data is triggered upon detection of said reference mark by said scanning mechanism.

18. The system of claim 15 wherein said marking module is located in a camcorder and said scanning mechanism, said storage mechanism and said recording mechanism are located in a docking station.

19. The system of claim 15 wherein said storage mechanism is the video tape within a video cassette and wherein said recording mechanism includes a memory-in-cassette module.

20. The system of claim 15 plural representative frames and said location data therefore are recorded on the video tape.

21. The system of claim 15 wherein said marking module, said scanning mechanism, said storage mechanism and said recording mechanism are located in a camcorder.

* * * * *